United States Patent
Buss et al.

(10) Patent No.: US 6,943,472 B2
(45) Date of Patent: Sep. 13, 2005

(54) DRIVE DEVICE

(75) Inventors: Heiko Buss, Buehl Altschweier (DE); Jens Maerkle, Buehl (DE)

(73) Assignee: Robert Bosch GmbH (DE)

( * ) Notice: Subject to any disclaimer, the term of this patent is extended or adjusted under 35 U.S.C. 154(b) by 61 days.

(21) Appl. No.: 10/474,408

(22) PCT Filed: Nov. 6, 2002

(86) PCT No.: PCT/DE02/04101
§ 371 (c)(1),
(2), (4) Date: Oct. 8, 2003

(87) PCT Pub. No.: WO03/071073
PCT Pub. Date: Aug. 28, 2003

(65) Prior Publication Data
US 2005/0012412 A1  Jan. 20, 2005

(30) Foreign Application Priority Data
Feb. 19, 2002  (DE) ......................... 102 07 004

(51) Int. Cl.[7] ................................. H02K 7/10
(52) U.S. Cl. ..................... 310/98; 310/89; 310/99
(58) Field of Search ..................... 310/67 R, 68 B, 310/68 R, 71, 83, 89, 98–99

(56) References Cited
U.S. PATENT DOCUMENTS

| | | | |
|---|---|---|---|
| 5,245,258 A | | 9/1993 | Becker et al. |
| 5,256,921 A | * | 10/1993 | Pruis et al. ............ 310/68 B |
| 5,444,315 A | * | 8/1995 | Adam et al. .............. 310/42 |
| 5,528,093 A | | 6/1996 | Adam et al. |
| 5,791,204 A | | 8/1998 | Torii et al. |
| 5,984,695 A | | 11/1999 | Riehl et al. |
| 6,114,820 A | | 9/2000 | Nishigaya |
| 6,191,512 B1 | | 2/2001 | Lekeux et al. |
| 6,317,332 B1 | | 11/2001 | Weber et al. |
| 2004/0021379 A1 | * | 2/2004 | Breynaert et al. ....... 310/68 B |

FOREIGN PATENT DOCUMENTS

| | | |
|---|---|---|
| DE | 42 33 156 A | 4/1994 |
| DE | 100 19 512 A | 8/2001 |
| DE | 100 20 018 A | 11/2001 |

\* cited by examiner

Primary Examiner—Thanh Lam
(74) Attorney, Agent, or Firm—Michael Best & Friedrich LLP

(57) ABSTRACT

Drive device (10), in particular to raise and lower windows in a motor vehicle, with an electric motor (12) featuring an armature shaft (16), a printed circuit board (32) projecting out of an electronic housing (36), a gearbox housing (18) and several guides (44) to spatially fix the printed circuit board (32) in the gearbox housing (18), whereby different guides (44) interact with the printed circuit board (32) for different printed circuit boards (32) with different widths (62) and/or lengths and/or with different distances (66) to the armature shaft

29 Claims, 3 Drawing Sheets

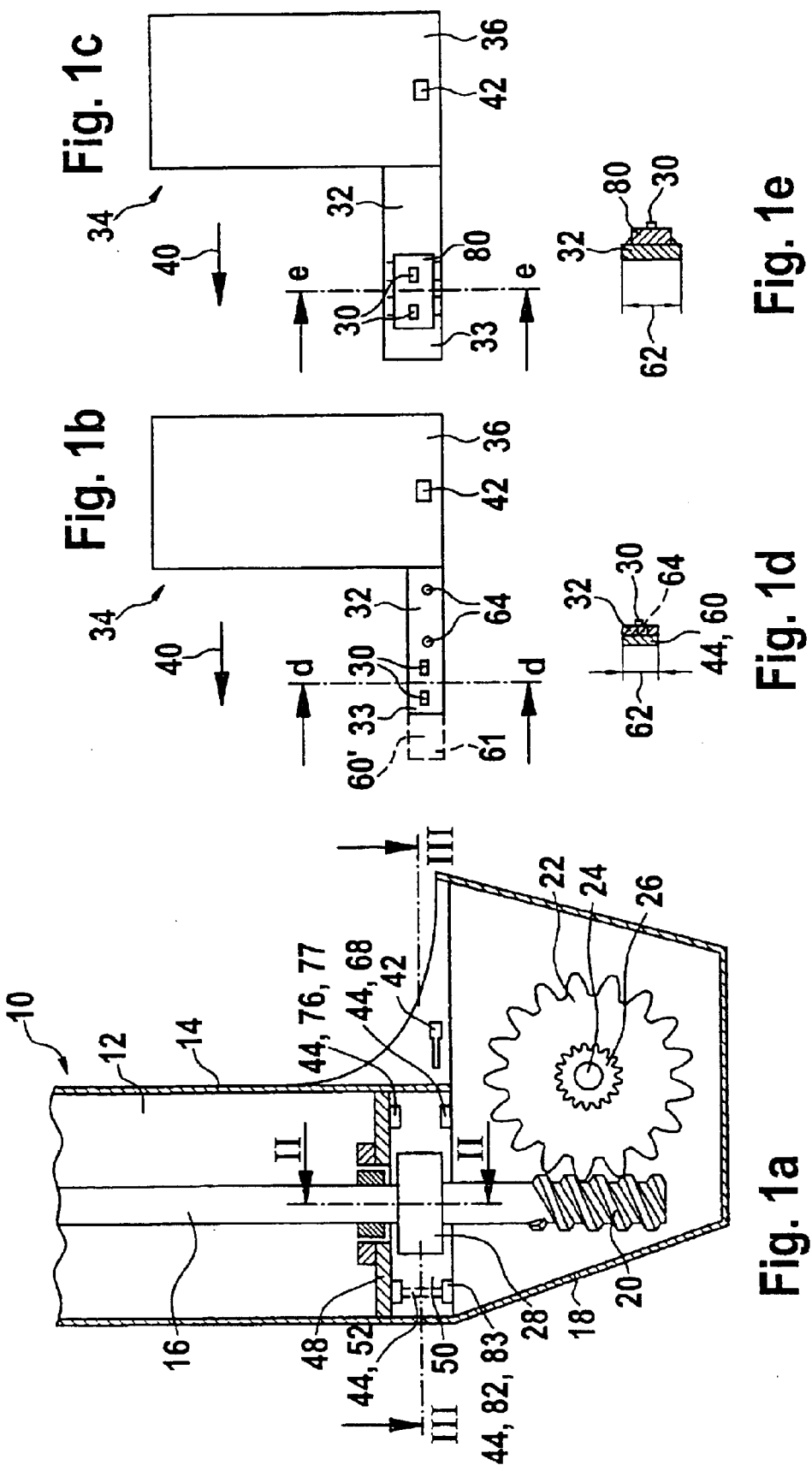

DRIVE DEVICE

STATE OF THE ART

The invention concerns a drive device in particular to raise and lower windows in a motor vehicle in accordance with the species of the independent claim.

Numerous drive devices for this purpose are known, for example from DE 200 04 338 A1. The drive device disclosed in this document features an electric motor with a gearbox housing, in which a plug-in module can be inserted. The plug-in module features a front surface with a connector for the motor power supply and a printed circuit board on which electronic components are arranged. A SMD Hall sensor is arranged on a narrow finger of the printed circuit board and in an assembled state the sensor interacts with a ring magnet of the armature shaft. In this case, only a guide provided with a seal on the front side of the plug-in module far away from the armature shaft is used to precisely position the Hall sensor.

If a guide is now formed for the printed circuit board finger to securely position the Hall sensor in the gearbox housing (in order to avoid deviations from the target distance of the Hall sensor during assembly or in the case of vehicle shocks, for example), this guide interferes when using other types of printed circuit boards. For other applications, for example with Hall sensors integrated on an ASIC, it is desirable that a wider printed circuit board having a different distance to the armature shaft can be plugged into the same gearbox housing. In doing this, these two printed circuit boards collide with the guides formed in the gearbox housing for the first printed circuit board thereby making it impossible to use same gearbox housing for different printed circuit boards.

ADVANTAGES OF THE INVENTION

The drive device in accordance with the invention with the feature of the main claim has the advantage that universal gearbox housings and electronic housings are created, which make assembly possible with differently formed printed circuit boards. There are enormous advantages to a modular production technique that is thereby made possible. The more complex larger housing parts can be produced in very large unit numbers. The associated simpler components, such as the electronic housing cover, can be adapted very simply to different printed circuit boards. The design of the guides in accordance with the invention in particular permits secure positioning of different printed circuit boards with different distances to the armature shaft.

Advantageous further developments of the drive device in accordance with the invention are made possible by the features listed in the sub-claims. If the guides are at least partially embodied as limit stops in the gearbox housing, on which the printed circuit board abuts with its side facing towards or facing away from the armature shaft, the distance of the Hall sensor to the magnet of the armature shaft is clearly fixed as a result. This permits a precise determination of position with low interfering signals.

If the guides in the gearbox housing are arranged in such a way that they interact with the axial edge areas of the printed circuit board, varying widths of printed circuit boards can be guided on axially different edge areas, whereby a collision of the one printed circuit board with the guides of the other printed circuit board can be avoided.

It is especially favorable to form one guide as a land on the electronic housing on which the printed circuit board rests since this land, in connection with the gearbox housing wall, assumes the function of a limit stop to fix a maximum distance of the printed circuit board from the armature shaft without such a limit stop having to be formed on the gearbox housing for this printed circuit board. As a result, this guide designed as a land does not collide with the guides arranged on the gearbox housing, which interact with the axial edge areas of the printed circuit board. The land abuts the printed circuit board in particular in the axially middle area and supports it against the gearbox housing wall.

It is especially simple in terms of manufacturing technology to form the land as one piece with the electronic housing, e.g., by means of an injection molding process. It is even more favorable to always design the electronic housing to be identical and merely form a land on the cover of the electronic housing in accordance with the desired printed circuit board.

If the printed circuit board is permanently connected to the land, e.g., with a clip or locking connection, this facilitates assembly of the electronic housing since displacement of the printed circuit board vis-à-vis the land is prevented. In addition, such a connection between the printed circuit board and the land permits a separate design of the land detached from the electronic housing.

It is advantageous to form the opening in the gearbox housing in such a way that the land can support itself on the one side on the gearbox housing during insertion and in an assembled state, and, on the other hand, the printed circuit board presses against a limit stop, which prescribes the minimum distance of the printed circuit board to the armature shaft.

If the land projects beyond the printed circuit board in the longitudinal direction, this free end of the land can support itself with its front side on another guide in the gearbox housing. The shorter design of the printed circuit board finger permits more effective material utilization during manufacture of the printed circuit board. If the electronic housing is embodied as a separate housing, it can be connected in a simple manner with the gearbox housing as a plug-in module. In this connection, the electronic housing features only one small opening from which the different printed circuit boards project. This relatively small opening between the electronic housing and the gearbox housing can be sealed against water and dirt in a relatively simple and effective manner.

In addition, guides can also be formed on a brush holder, which can be mounted axially to the armature shaft as an approximately annular component. Since the brush holder lies in the direct spatial vicinity of the magnet of the armature shaft, these guides also afford reliable spatial fixing of the Hall sensors vis-à-vis the ring magnet.

It can be advantageous in terms of manufacturing technology to design the guides as grooves in the gearbox housing or in the brush holder into which the axial edge areas of the printed circuit board are plugged.

The compatibility of the gearbox housing and the electronic housing with the various printed circuit boards permits the use of both SMD Hall sensors with relatively low printed circuit board space requirements and Hall sensors that are integrated into a ASIC and require more construction space on the printed circuit board. As a result, the design of the drive device is independent of future electronic developments in this area.

Due to the parallel arrangement of the printed circuit board with the armature shaft, the Hall sensor can be fastened directly on the printed circuit board with or without ASIC, to some extent by means of fully automatic SMD processes, without a special holder being required for the Hall sensors.

If a worm is formed on the armature shaft, which drives a worm gear with an output gear, a compact adjusting drive with exact determination of position is thereby created, such as is used for window lifters in motor vehicles, for example.

DRAWINGS

Exemplary embodiments of the invention area depicted in the drawings and explained in more detail in the following description:

FIG. 1a shows a schematic representation of a drive device in accordance with the invention;

FIG. 1b shows an electronic plug-in module for the drive device in accordance with FIG. 1a;

FIG. 1c shows another electronic plug-in module with a different printed circuit board;

FIGS. 1d and 1e show two sections through the plug-in module in accordance with Lines d—d and e-e;

Figure 2A:
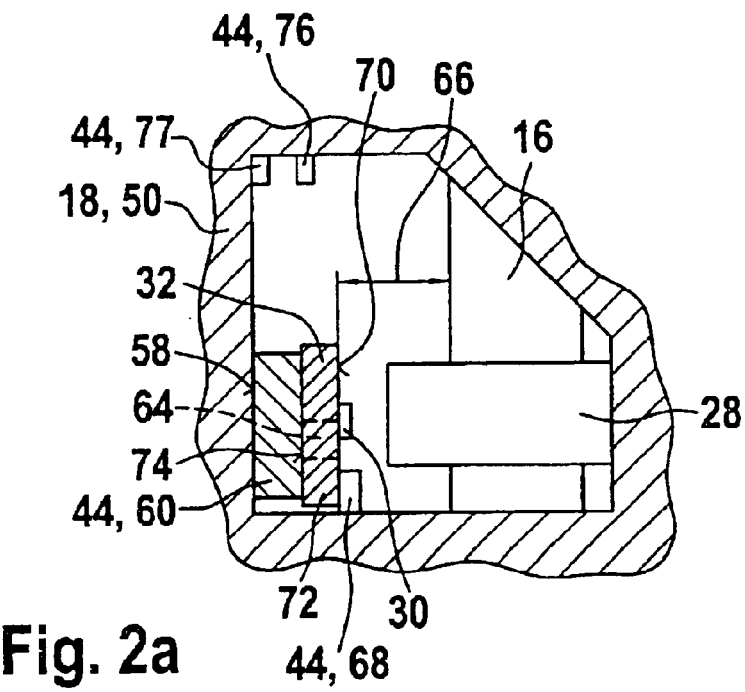
Figure 2B:
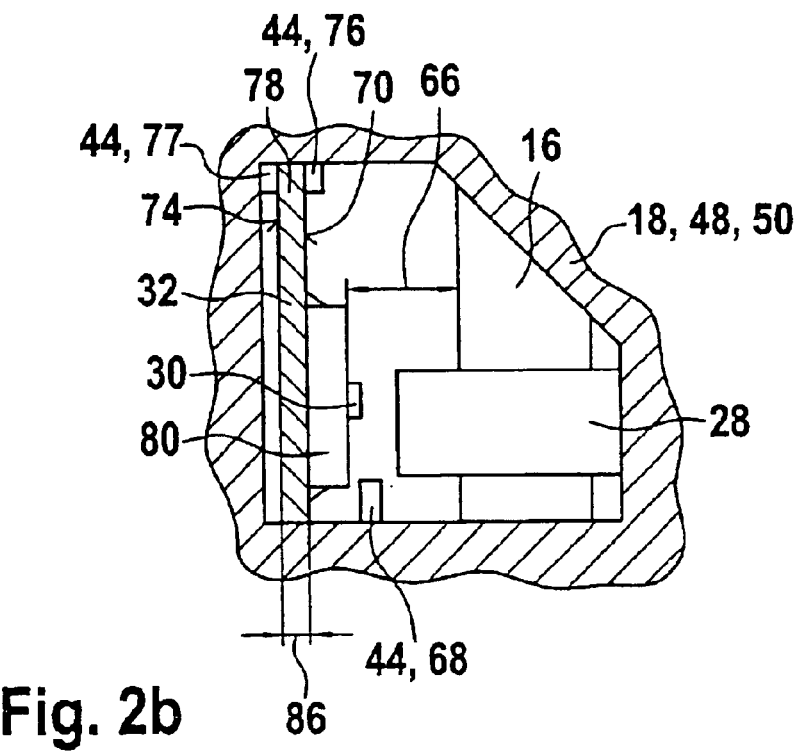
Figure 3A:
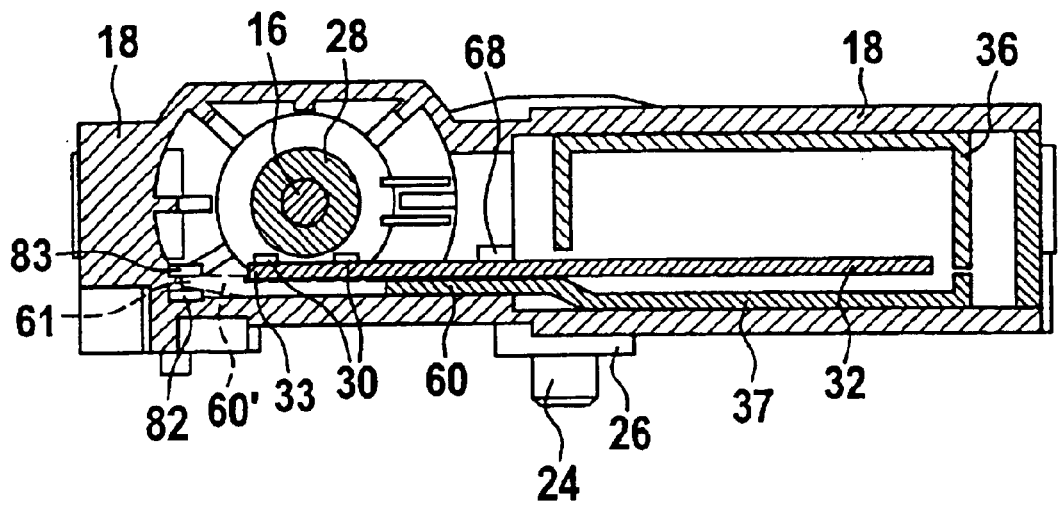
Figure 3B:
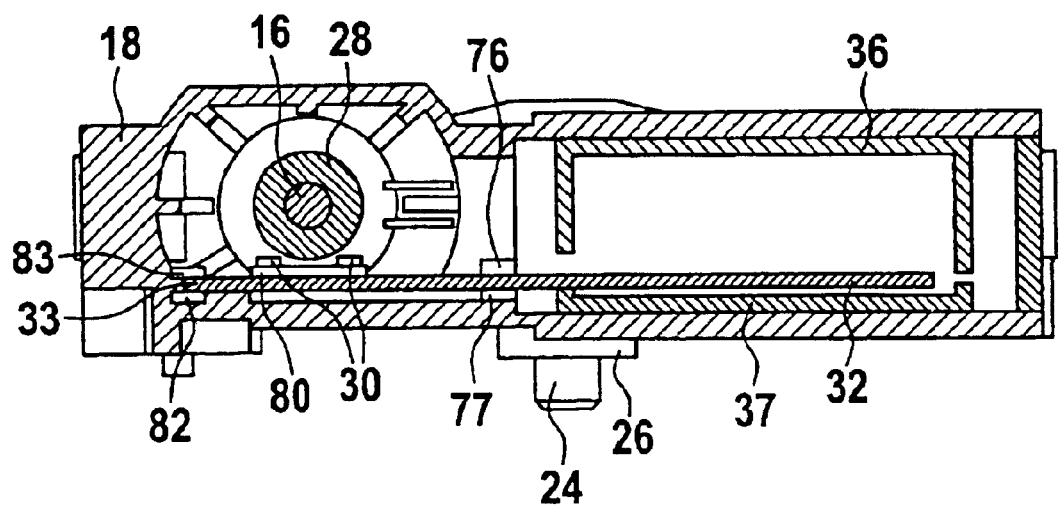

FIGS. 2a and 2b show two partial sections in accordance with Line II—II of the two different inserted printed circuit boards according to FIGS. 1b and 1c; and FIGS. 3a and 3b show two sections of the two inserted plug-in modules in accordance with Line III—III.

DESCRIPTION OF THE EXEMPLARY EMBODIMENTS

FIG. 1a depicts a drive device 10 for a window lifter, which features an electric motor 12 with a pole casing 14 from which an armature shaft 16 projects into a gearbox housing 18. Arranged on the armature shaft 16 is a worm 20, which meshes with a driven gear 22 and transmits the force via an output gear 26 positioned on its axis 24 to the window lifting mechanics (not shown in greater detail). To determine the position of an adjustable part, a ring magnet 28 is arranged on the armature shaft 16 in the area of the gearbox housing 18, which ring magnet interacts with Hall sensors 30, which are arranged on a printed circuit board 32 of an electronic plug-in module 34. FIG. 1b shows such a plug-in module 34, which is embodied as a separate electronic housing 36 from which a part of the printed circuit board 32 projects as a plug-in finger. For assembly, the plug-in module 34 is inserted into the gearbox housing 18 with the plug-in finger in accordance with arrow direction 40 and permanently connected with the gearbox housing 18 by means of locking elements 42. For exact spatially positioning, the printed circuit board 32 is guided by means of guides 44 during plug-in and fixed in an assembled state. In the exemplary embodiment the guides 44 are formed as limit stops 68, 76, 77, 82, 83 in the gearbox housing 18 and formed on an annular brush holder 48 mounted axially to the armature shaft 16. Depending upon the design of the drive device 10, the borders between the individual housing parts can also be embodied differently so that, e.g., the ring magnet 28 is also arranged in the area of an extended pole casing 14 or a separate intermediate piece 50—which is essentially formed by the brush holder 48 for example—between the gearbox housing 18 and the pole casing 14. The guides 44 are embodied for example to be one piece with the corresponding housing parts 18, 14, 50, 48 preferably by means of an injection molding process. One part of the guides 44 is embodied as a groove 52 in a housing wall. In FIGS. 1b and 1d, a land 60 is formed on the electronic housing 36, which features the same width 62 as the printed circuit board 32 and is connected to said circuit board by means of a clip connection 64. The Hall sensors 30 are attached very flatly to the printed circuit board 32 using SMD technology so that the printed circuit board 32 is positioned at a short distance 66 to the armature shaft 16 tangential to the ring magnet 28.

FIG. 2a shows a section through the plugged-in printed circuit board 32 of the plug-in module 34 from FIG. 1b. With its side 70 facing the ring magnet 28, the printed circuit board 32 is adjacent in the area 72 axially facing away from the electric motor 12 to a limit stop 68 of the gearbox housing 18, which determines the minimum distance of the printed circuit board 32 to the ring magnet 28. The guide 44 formed as a land 60 is adjacent to the printed circuit board 32 on its side 74 facing away from the ring magnet 28 and presses the printed circuit board 32 against the limit stop 68. With the other side, the land 60 supports itself on the gearbox housing 18 and thereby forms a limit stop for the printed circuit board 32, which corresponds to the maximum distance of the printed circuit board 32 to the ring magnet 28.

FIG. 1c shows another plug-in module 34, whose electronic housing 36 is formed essentially the same as that in FIG. 1b. However, the plug-in module 34 is equipped with a different printed circuit board 32, which features a greater width 62 on its area projecting out the electronic housing 36 in order to accommodate an ASIC component 80 for example. The ASIC component contains a complete microprocessor for control electronics and is positioned on the printed circuit board 32 in such a way that the Hall sensors 30 integrated into the ASIC 80 are positioned directly across from the ring magnet 28 in a plugged-in state. Due to the larger construction height of the ASIC 80, the distance between the printed circuit board 32 and the armature shaft 16 is greater than in the case of the SMD Hall sensors 30 as can be seen in the illustration in FIG. 2b. The limits stop 68 for the printed circuit board 32 with the SMD Hall sensors 30 remains unused in this arrangement, and the wider printed circuit board 32 with the ASIC 80, on the other hand, is spatially fixed in its distance to the ring magnet 28 by two limit stops 76 and 77 on the gearbox housing 18 or the brush holder 48. In this arrangement, the printed circuit board 32 is adjacent with its area 78 axially facing the electric motor 12 to its side 70 facing the ring magnet 28 at the limit stop 76 to determine the minimum distance 66, and is pressed against the limit stop 76 by the limit stop 77, which abuts the side 74 facing away from the ring magnet 28. In the process, the limit stop 77 assumes the function of the land 60 in the case of the narrower printed circuit board 32. As a result, the plug-in module 34 does not have a land 60 in the case of the wide printed circuit board 32 with the ASIC 80. On the other hand, the limit stops 76 and 77 have no function in the case of the plug-in module 34 with the narrow printed circuit board 32 in FIG. 2a.

FIG. 3a shows a section with a mounted plug-in module 34 with a narrow printed circuit board 32 in accordance with FIG. 2a. The printed circuit board 32 in this case just projects out of the electronic housing 36 into the gearbox housing 18, whereby the printed circuit board 32 is arranged parallel to the armature shaft 16, or tangentially to the ring magnet 28. The limit stop 68 on the side of the printed circuit board 32 facing away from the electric motor 12 prescribes the minimum distance to the armature shaft 16, and the land 60, which is embodied here as one piece with the electronic housing 36, presses the printed circuit board 32 against the limit stop 68, whereby the land 60 is supported on the wall of the gearbox housing 18. In this connection, the gearbox housing 18 features a cover 37, with which the land 60 is arranged approximately in a plane. Due to the low construction space of the SMD Hall sensors 30, the printed circuit board 32 does not extend up to the limit stops 82, 83 or the groove 52, which are arranged in the area of the free end 33 of the printed circuit board 32 on the gearbox housing 18.

FIG. 3b correspondingly depicts a section through the wide printed circuit board 32 with the ASIC 80. This printed circuit board 32 is spatially fixed by the two limit stops 76, 77, which guide the printed circuit board 32 at the area facing the electric motor 12. As a result, the cover 37 of the gearbox housing 18 does not have a land 60. The printed circuit board 32 extends beyond the ring magnet 28 and is also guided here at its free end 33 by the two limit stops 82 and 83. Alternatively, the two limit stops 82, 83 can also be formed as a groove 52 in the gearbox housing in the axial direction, which can accommodate the free end 33 of the printed circuit board 32 over its entire width. The additional fixing of the printed circuit board 32 at its free end 33 prevents the distance between the Hall sensors 30 and the ring magnet 28 from being altered, e.g., by outside shocks.

The land 60 is embodied to be longer than the free end 33 of the printed circuit board in an alternative exemplary embodiment with a plug-in module 34 with the narrow printed circuit board 32. This extension 60' of the land also makes additional fixing at the limit stops 82 and 83 or the groove 52 possible. The extension 60' of the land 60 is formed in this case in such a way that its end 61 has exactly the same distance 66 to the armature shaft 16 as the printed circuit board in FIG. 3b that is embodied to be longer. In this connection, the extension 60' has the same thickness 86 at its end 61 as the standardized thickness 86 of the two printed circuit boards 32. As a result, the shorter printed circuit board 32 is also additionally fixed at its free end 33 by the extension 60' in order to guarantee a constant distance 66 between the printed circuit board 32 and the armature shaft 16.

In another exemplary embodiment, the plug-in module 34 is not embodied with a separate electronic housing 36, but is completely inserted into the gearbox housing 18 so that, e.g., a front side of the plug-in module 34 simultaneously constitutes a cover for the gearbox housing 18. In this case, the printed circuit board 32 is not formed to be L-shaped, for example, as in FIGS. 1b or 1c, but formed as a whole as approximately rectangular, whereby one side of the rectangle corresponds to the width 62.

The device in accordance with the invention is not limited to the two described plug-in modules, but includes any combination of different plug-in modules with different printed circuit boards 32 with a single gearbox housing. In the process, the land 60 can also be embodied as a separate component, which is fastened to the rear side of the printed circuit board 32, e.g., glued or clipped on.

What is claimed is:

1. Drive device (10), in particular to raise and lower windows in a motor vehicle, and for use with a printed circuit board (32) projecting out of an electronic housing (36), the device comprising an electric motor (12) featuring an armature shaft (16), a gearbox housing (18) and guides (44) configured for interaction with varying printed circuit boards to spatially fix a selected printed circuit board (32) in the gearbox housing (18), wherein different guides (44) interact with the printed circuit board (32) for different printed circuit boards (32) with different widths (62) and/or lengths and/or with different distances (66) to the armature shaft (16).

2. Drive device (10) according to claim 1, characterized in that at least one portion of the guides (44) is embodied as limit stops (44, 68, 76, 77, 82, 83, 52) on the gearbox housing (18), on which the printed circuit board (32) abuts with its side (70, 74) facing towards or facing away from the armature shaft (16) to fix a minimum or maximum distance (66) to the armature shaft (16).

3. Drive device (10) according to claim 1, characterized in that at least one portion of the guides (44) is arranged in the gearbox housing (18) in such a way that the printed circuit board (32) abuts these guides (44) on their areas (78, 72) axially facing towards and facing away from the electric motor (12).

4. Drive device (10) according to claim 1, characterized in that at least one guide (44, 60, 60'), particularly for a printed circuit board (32) with a small width (62), is embodied as a land (60, 60'), which can be plugged into the gearbox housing (18) with the printed circuit board (32).

5. Drive device (10) according to claim 4, characterized in that the land (60, 60') is formed on the electronic housing (36), particularly as one piece on its cover (37).

6. Drive device (10) according to claim 4, characterized in that the printed circuit board (32) is permanently connected to the land (60, 60'), particularly by means of a clip connection (64).

7. Drive device (10) according to claim 4, characterized in that the land (60, 60') is supported on its side (58) facing away from the printed circuit board (32) on the gearbox housing (18).

8. Drive device (10) according to claim 4, characterized in that the land (60, 60') is embodied to be longer than the printed circuit board (32) and with its free end (61) abuts guides (44), which are arranged as limit stops (82, 83, 52) on the gearbox housing (18).

9. Drive device (10) according to claim 1, characterized in that the electronic housing (36) is embodied to be separable and can be connected to the gearbox housing (18), particularly by means of locking elements (42).

10. Drive device (10) according to claim 1, characterized in that a brush holder (48) can be mounted axially to the armature shaft (16), on which brush holder particularly guides (44) for the printed circuit board (32) are formed.

11. Drive device (10) according to claim 1, characterized in that the guides (44) are at least partially embodied as grooves (52).

12. Drive device (10) according to claim 1, characterized in that both a printed circuit board (32) with Hall sensors (30) integrated into an ASIC (80) and a printed circuit board (32) directly equipped with Hall sensors (30) can be fixed on both sides by means of guides (44).

13. Drive device (10) according to claim 1, characterized in that the printed circuit board (32) is arranged parallel to the armature shaft (16), in particular tangential to a magnet (28) fastened to this shaft.

14. Drive device (10) according to claim 1, characterized in that the armature shaft (16) features a worm (20), which meshes with a worm wheel (22), on whose axis (24) an output gear (24) is arranged.

15. A method of providing a drive device to raise and lower windows in a motor vehicle, the method comprising:
providing a device with an electric motor having an armature shaft and a gearbox housing;
providing the device with guides configured for interaction with varying printed circuit boards to spatially fix a selected printed circuit board in the gearbox housing, wherein different guides interact with different printed circuit boards with different widths and/or lengths and/or with different distances to the armature shaft; and plugging into the device a selected printed circuit board projecting out of an electronic housing, such that the selected printed circuit board is fixed in the gearbox housing by the guides.

16. A method according to claim 15, wherein providing the guides includes providing on the gearbox housing limit stops which abut the printed circuit board.

17. A method according to claim 16 wherein the limit stops abut the side of the printed circuit board facing towards or facing away from the armature shaft to fix a minimum or maximum distance to the armature shaft.

18. A method according to claim 17 wherein at least one portion of the guides is arranged in the gearbox housing in such a way that the printed circuit board abuts the guides on areas axially facing towards and facing away from the electric motor.

19. A method according to claim 18 wherein at least one guide, particularly for a printed circuit board with a small width, is embodied as a land which can be plugged into the gearbox housing with the printed circuit board.

20. A method according to claim 19 wherein the land is formed on the electronic housing, particularly as one piece on its cover.

21. A method according to claim 20 wherein the printed circuit board is permanently connected to the land, particularly by means of a clip connection.

22. A method according to claim 21 wherein the land is supported on its side facing away from the printed circuit board on the gearbox housing.

23. A method according to claim 22 wherein the land is embodied to be longer than the printed circuit board and with its free end abuts guides, which are arranged as limit stops on the gearbox housing.

24. A method according to claim 23 wherein the electronic housing is embodied to be separable and can be connected to the gearbox housing, particularly by means of locking elements.

25. A method according to claim 24 wherein a brush holder can be mounted axially to the armature shaft, on which brush holder particularly guides for the printed circuit board are formed.

26. A method according to claim 25 wherein the guides are at least partially embodied as grooves.

27. A method according to claim 26 wherein both a printed circuit board with Hall sensors integrated into an ASIC and a printed circuit board directly equipped with Hall sensors can be fixed on both sides by means of guides.

28. A method according to claim 27 wherein the printed circuit board is arranged parallel to the armature shaft, in particular tangential to a magnet fastened to this shaft.

29. A method according to claim 28 wherein the armature shaft features a worm, which meshes with a worm wheel, on whose axis an output gear is arranged.

\* \* \* \* \*